(12) United States Patent
Honma (10) Patent No.: US 6,172,766 B1
(45) Date of Patent: Jan. 9, 2001

(54) IMAGE PROCESSING METHOD AND APPARATUS AND STORAGE MEDIUM

(75) Inventor: Hideo Honma, Tokyo (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/093,353

(22) Filed: Jun. 9, 1998

(30) Foreign Application Priority Data

Jun. 12, 1997 (JP) .................................... 9-155064
Jun. 4, 1998 (JP) ................................. 10-155909

(51) Int. Cl.⁷ .................................................... G06F 15/00
(52) U.S. Cl. .......................... 358/1.2; 358/1.18; 358/448; 358/453; 358/538; 345/432
(58) Field of Search ............................... 358/1.1, 1.2, 1.9, 358/1.11, 1.13, 1.15, 1.18, 296, 298, 448, 451, 452, 453, 538, 537; 345/432, 433, 434, 435; 382/120, 256, 266, 269

(56) References Cited

U.S. PATENT DOCUMENTS 5,832,184 * 11/1998 Konno et al. ......................... 358/1.1
5,940,080 * 8/1999 Ruehle et al. ....................... 345/432
6,025,927 * 2/2000 Honma .................................. 358/1.1

* cited by examiner

*Primary Examiner*—Edward L. Coles
*Assistant Examiner*—Mark Wallerson
(74) *Attorney, Agent, or Firm*—Fitzpatrick, Cella, Harper & Scinto (57) ABSTRACT

A drawing object is processed in accordance with an attribute thereof to obtain an output image of a high quality. To this end, an image processing method for developing a drawing object, converting the drawing object into a code representative of a pattern for each set of a plurality of dots, and outputting the code to an output device, includes the steps of, judging whether the drawing object is a resolution prominent object, developing a drawing object which is not the resolution prominent object at a first resolution to convert into the code, developing the resolution prominent object at a second resolution higher than the first resolution, deriving an edge portion from an image developed at the second resolution, for each of blocks constituted of the plurality of dots, and converting the edge portion into an edge pattern code for each set of the plurality of dots, and outputting the code and the edge pattern code to the output device.

6 Claims, 6 Drawing Sheets

DIRECTION = 0

IMAGE PROCESSING METHOD AND APPARATUS AND STORAGE MEDIUM

BACKGROUND OF THE INVENTION

1. Field of the Invention

The present invention relates to an image processing method and apparatus for processing an image in accordance with an attribute of a drawing object, and to a storage medium which stores program codes realizing such a method.

2. Related Background Art

Figure 9:
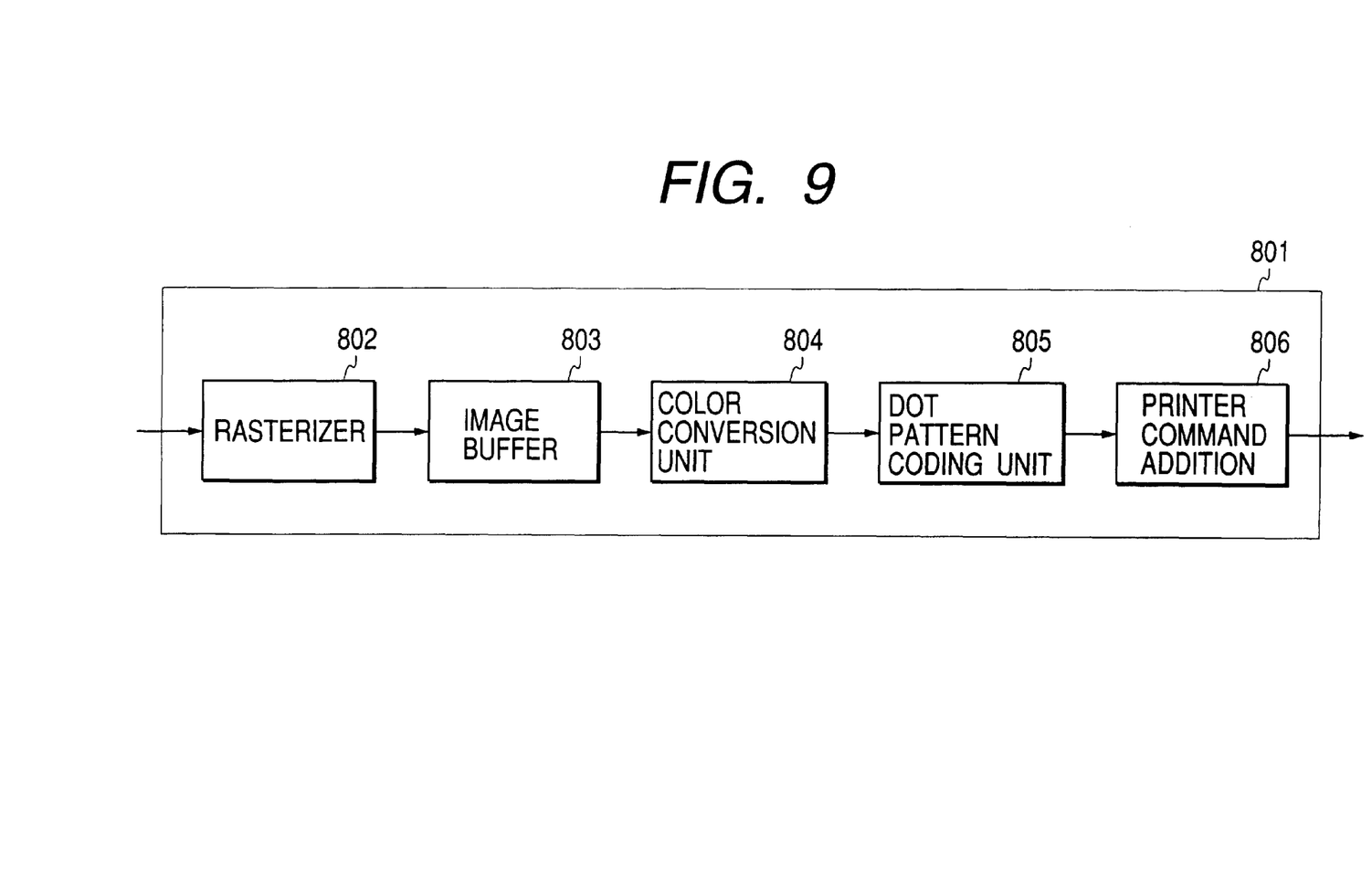
FIG. 9 is a block diagram showing the structure of a conventional printer driver.

An example of the structure of a conventional image processing apparatus is shown in FIG. 9. Reference numeral 801 represents a printer driver, and reference numeral 802 represents a rasterizer for rasterizing a drawing object generated by an application program and received from a system. Reference numeral 803 represents an image buffer used for configuring a print image of a rasterized drawing object. Reference numeral 804 represents a color conversion unit for converting a logical color of the contents in the image buffer into a physical color to be printed out with a printer. Reference numeral 805 represents a dot pattern coding unit for converting color converted data into a print dot pattern to be printed with the printer and coding the print dot pattern. Reference numeral 806 represents a printer command addition unit for adding a command to the dot pattern code to allow the printer to receive the dot pattern code.

In the apparatus shown in FIG. 9, the printer resolution is sufficiently higher than that of the rasterized image, and each rasterized pixel is expressed by a plurality of print dots. Each pixel can therefore have a broad color expression.

Data generated by various applications are constituted of a plurality of drawing objects in one page. Each object has one of the following attributes:
 i) Image;
 ii) Graphics;
 iii) Text.

In each page, each drawing object is rendered at the same resolution. Means for the rendering (color conversion process, rendering resolution, and dot pattern formation) is designed to balance all object attributes.

The above conventional apparatus has been found, however, unsatisfactory in the following points:

(1) If the whole area of a page is rasterized at a high resolution in order to maintain a high grade of a text, it takes a long time to perform a color conversion process in the rasterizing process, and a use amount of a memory increases.

(2) A density pattern method is known as a method for efficiently utilizing a resolution of a printer. With this method, a plurality of dots are processed by dividing them into groups so that a gradation representation performance can be improved. However, if the rasterizing resolution is lowered, the qualities of graphics and texts are considerably degraded although images are less affected. Specifically, there are two types of drawing objects, one (text, graphics) giving prominence to a resolution and the other giving prominence to a gradation (color representation).

SUMMARY OF THE INVENTION

It is an object of the present invention to form an output image of a high quality by processing an image in accordance with the attribute of each drawing object.

According to a preferred embodiment of the invention achieving the above object, an image processing method for developing a drawing object, converting the drawing object into a code representative of a pattern for each set of a plurality of dots, and outputting the code to an output device, is provided, the method comprising the steps of: judging whether the drawing object is a resolution prominent object; developing a drawing object which is not the resolution prominent object at a first resolution to convert into the code; developing the resolution prominent object at a second resolution higher than the first resolution; deriving an edge portion from an image developed at the second resolution, for each of blocks constituted of the plurality of dots, and converting the edge portion into an edge pattern code for each set of the plurality of dots; and outputting the code and the edge pattern code to the output device.

The other objects and features of the invention will become apparent from the following detailed description of preferred embodiments when read in conjunction with the accompanying drawings.

DETAILED DESCRIPTION OF THE PREFERRED EMBODIMENTS (First Embodiment)

Figure 1:
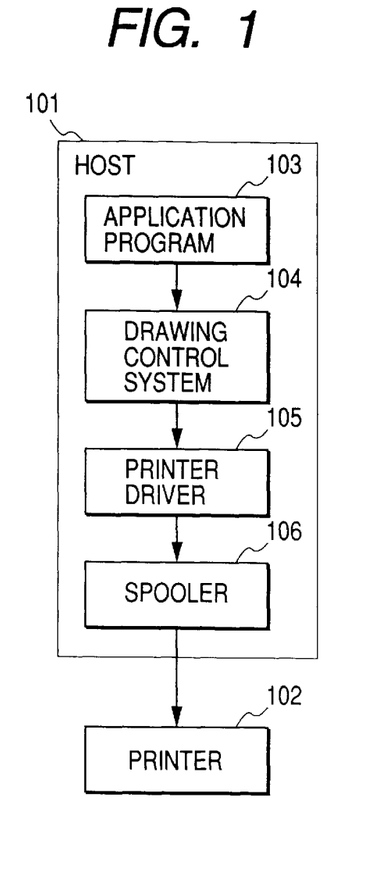
FIG. 1 is a flow chart illustrating a print process.

A flow chart illustrating a print process according to the first embodiment is shown in FIG. 1. Reference numeral 101 represents a host (PC), reference numeral 102 represents a printer, reference numeral 103 represents an application program, reference numeral 104 represents a drawing control system, reference numeral 105 represents a printer driver, and reference numeral 106 represents a spooler.

Print job data created (generated) by the application 103 is sequentially passed to the drawing control system 104. The drawing control system 104 performs a drawing control of each page or each band, and is usually constituted of a system level program.

The printer driver 105 converts a drawing object passed from the drawing control system 104 in the unit of object into physical data capable of being printed with the printer 102, and passes the physical data to the spooler 106. For example, the drawing object is logical data expressed by vector information or the like. The spooler 106 manages a print output of the print data in the unit of print job. In this embodiment, the printer 102 is an ink jet printer having a CMYK head capable of forming an image at a resolution of 600 dpi.

Figure 2:
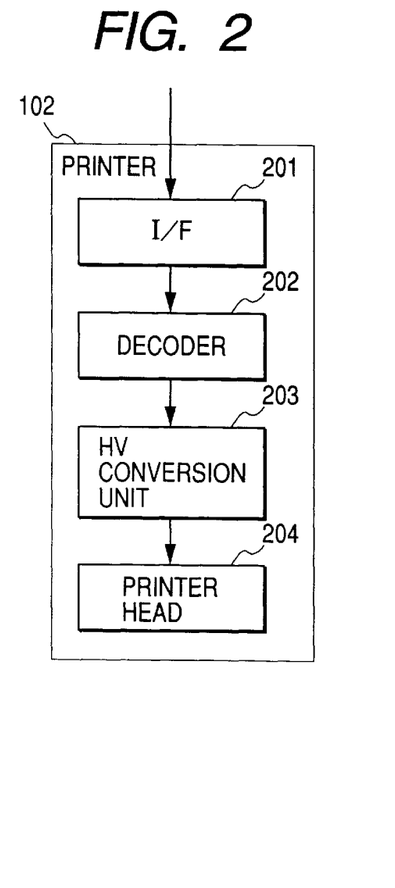
FIG. 2 is a flow chart illustrating the printer internal processes.

A flow chart illustrating the image process by the printer 102 is shown in FIG. 2. Reference numeral 201 represents an interface circuit, reference numeral 202 represents a decoder for decoding dot pattern codes, reference numeral 203 represents an HV conversion circuit for converting a decoded print dot pattern into the data matching an array of nozzles of a printer head, and reference numeral 204 represents the printer head.

Print data transferred from the host is passed via the interface circuit 201 to the decoder 202.

The decoder 202 decodes the dot pattern code created by the printer driver 105 into print dot data to be printed with the printer head. With the printer head of an ink jet type, the dot pattern code is converted into a binary dot pattern of YMCK.

The HV conversion unit 203 converts the dot pattern created by the decoder into the data series matching the array of recording elements or nozzles of the printer head 204. Specifically, with the ink jet type, the dot pattern is converted into the data series in the jetting order of print dots of a plurality of nozzles disposed in a sub-scan direction. The details of the HV conversion process are given in U.S. application Ser. No. 638,590 filed on Apr. 29, 1996.

In this embodiment, it is assumed that the printer 102 has a resolution of 600 dpi and the printer driver 105 creates data having a resolution of 600 ppi or 300 ppi in accordance with an attribute of a drawing object. Namely, for an object giving prominence to a resolution, a 600 ppi rasterizing is performed to represent an edge with a 600 dpi image. For the other objects, a 600 dpi dot pattern constituting 2×2 blocks is formed from 300 ppi rasterized data to represents a gradation. Data created by the printer driver 105 is a coded dot pattern of 2×2 blocks corresponding to the 300 ppi rasterized data. The edge representing dots of an object giving prominence to the resolution are also represented by this coded dot pattern.

Figure 3A:
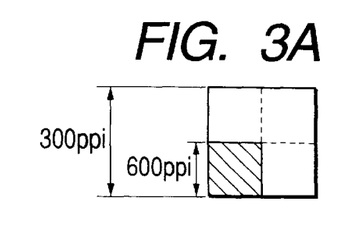
FIGS. 3A, 3B and 3C are diagrams illustrating dot blocks.
Figure 3B:
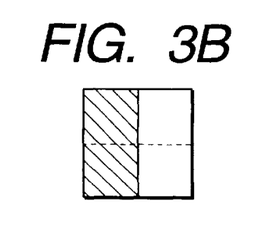
Figure 3C:
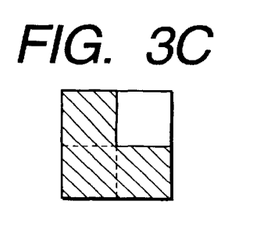

Texts and graphics are not always the resolution prominent object. A half tone of 300 dpi is represented by 2×2 blocks of 600 dpi. Since an edge is represented by a 600 dpi dot pattern, the dot patterns to be expressed are limited. Specifically, as shown in FIGS. 3A to 3C, there are three types of dot patterns and directions indicated by hatching. In order to represent an edge, it is necessary that YMCK all have the same pattern. The colors of an object effective for an edge retention are therefore limited. Practically, the colors are YMCKRGB capable of being represented by one dot. In this case, it is assumed that the color materials are YMCK and that RGB colors are formed by printing the same dot twice. Therefore, a resolution prominent object is limited to texts and graphics of a YMCKRGB monochromatic color object.

Figure 4:
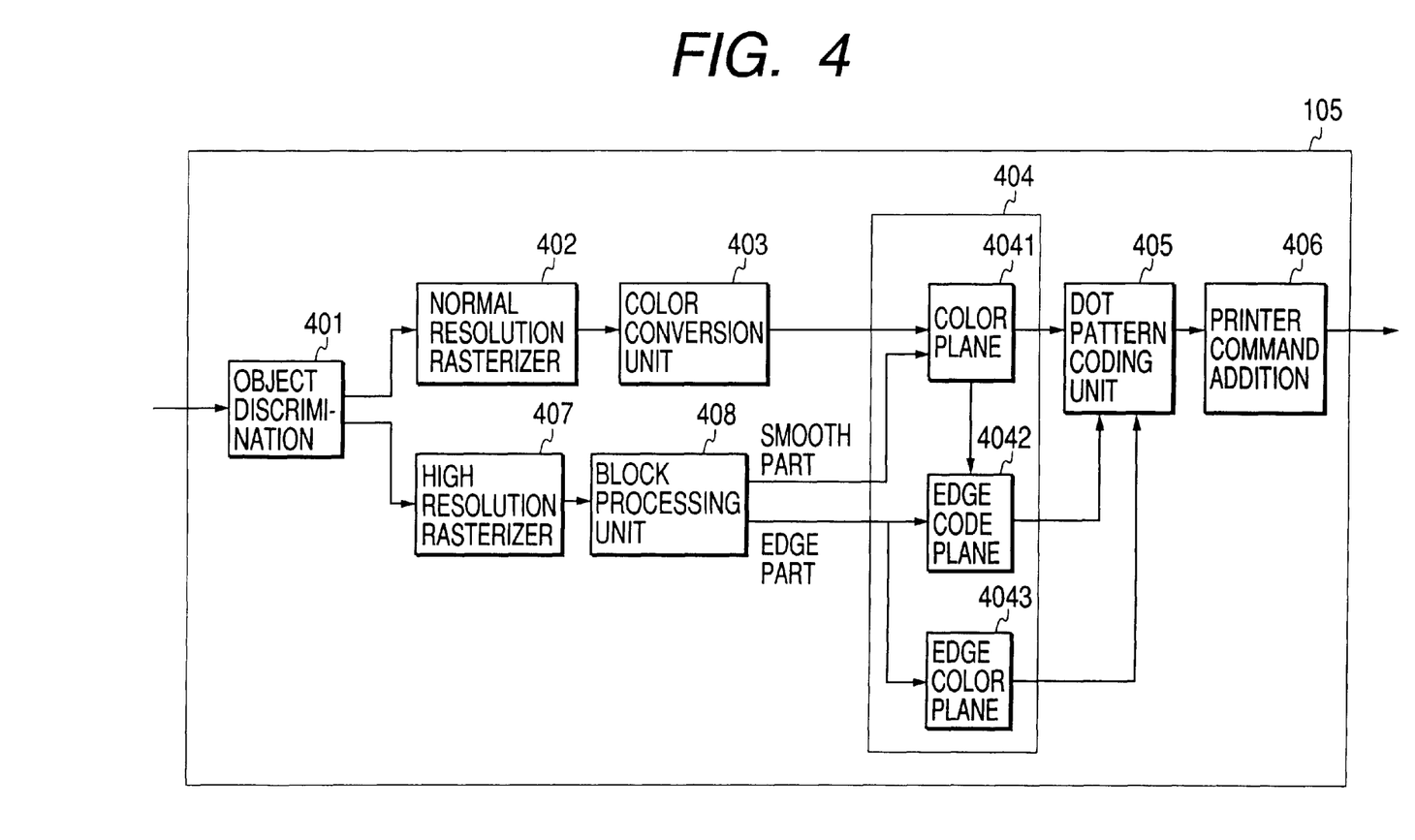
FIG. 4 is a block diagram showing the structure of a printer driver according to a first embodiment.

Next, an example of the structure of the printer driver 105 will be described with reference to FIG. 4. An object discrimination unit 401 discriminates whether a drawing object passed from the drawing control system 104 is a gradation prominent object or a resolution prominent object, in accordance with logical information of the drawing object. If the object is a resolution prominent object, it is passed to a high resolution rasterizer 407, whereas if not, it is passed to a normal resolution rasterizer 402.

The normal resolution rasterizer 402 rasterizes each object at 300 ppi to create a drawing image. This object drawing image is represented by a logical color space passed from the host.

A color conversion unit 403 converts a color space of the object drawing image into a physical color space to be expressed with the printer 102.

An image buffer 404 corresponds to one page generally called a band buffer and divided into a plurality of subsidiary fields. The image buffer 404 synthesizes an output of each drawing object from the color conversion unit 403 to form a drawing image to be sent to the printer. This synthesis is performed as a raster operation instructed by the drawing control system 104.

The image buffer is constituted of a color plane 4041, an edge code plane 4042, and an edge color plane 4043, each usually having a resolution of 300 ppi. A gradation prominent object output from the color conversion unit 403 is changed on the color plane 4041 to a drawing image to be sent to the printer, by the raster operation instructed by the drawing control system 104. The color plane 4041 has usually a depth of the number of output bits of the normal resolution rasterizer 402, per each pixel, e.g., 8 bits for each RGB represented by the physical color space.

The high resolution rasterizer 407 rasterizes a resolution prominent object at 600 ppi. As described above, the resolution prominent object is a limited monochromatic color object so that the object rasterization can be performed by using a binary value. In this case, an object color is stored in another register or the like.

A block processing unit 408 processes 600 ppi object data for each 2×2 blocks, and a smooth part of the object data is changed on the color plane 4041 to a drawing image as an application output of 300 ppi data, similar to the gradation prominent object of a normal resolution. If the high resolution rasterization is performed by using a binary value, a chromatic pixel is replaced by object color data separately prepared, and converted into a depth bit of the color plane 4041 to form a drawing image on the color plane 4041.

If 2×2 blocks contain an edge, the block containing the edge is called an edge block. The edge pattern is one of the three types shown in FIGS. 3A to 3C. Specifically, the number of dots is one of 1, 2 and 3. The number of dots inclusive of the direction can be represented by 4 bits. This information is stored in the edge code plane 4042, and the edge color is stored in the edge color plane 4043. A depth of the edge color plane 4043 becomes sufficient if it has as many as 3 bits. This is because as described previously, color representation is limited to RGBYMCK in representing an edge in 2×2 blocks.

A dot pattern coding unit 405 generates a dot pattern code by using a predetermined algorithm, in accordance with the information supplied from the color plane 4041, edge code plane 4042 and edge color plane 4043. If the printer is of an ink jet type, the dot pattern is constituted of a binary value of each YMCK. Since the 2×2 dot pattern representations are limited, each dot pattern is determined by an error diffusion method or the like. If the dot pattern contains an edge block, this dot pattern is processed with a priority to cause it to be included in the code. Specifically, the edge code for forming a dot pattern of the edge block is created through overwrite on a color representation dot pattern. In this case, as dots (not hatched in each block shown in FIGS. 3A to 3C) under the edge pattern, the dots of a dot pattern created by the color plane 4041 are used.

If the raster operation is performed for the edge block of another object, the color plane data is processed and the dot pattern of the edge block is formed through overwrite or underwrite.

A printer command addition unit 406 processes the dot pattern code created in the above manner so as to allow it to be received by the printer 102, and adds a command.

The code processed in the above manner is stored and managed by the spooler 106 and sent to the printer 102 to be printed out.

Figure 6A:
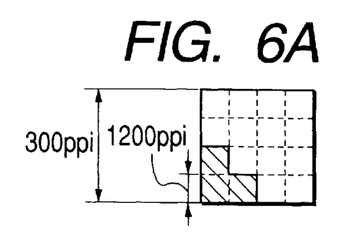
FIGS. 6A, 6B and 6C are diagrams illustrating dot blocks.
Figure 6B:
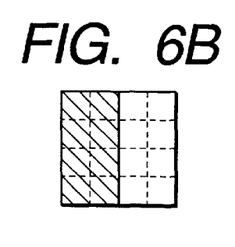
Figure 6C:
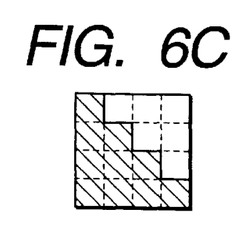

In the example of the structure described above, the printer head is assumed to be 600 dpi. One pixel of a resolution prominent object rasterized at 600 ppi corresponds to one dot as shown in FIGS. 3A to 3C. If the printer head is 1200 dpi, one pixel of 600 ppi is constituted of dots of 2×2 blocks. In this case, if the edge dots are configured as shown in FIGS. 6A to 6C, a better representation of an oblique edge line can be drawn. With the 600 ppi rasterization, if the edge is that shown in FIG. 3A, the dots are configured as shown in FIG. 6A, if the edge is that shown in FIG. 3B, the dots are configured as shown in FIG. 6B, and if the edge is that shown in FIG. 3C, the dots are configured as shown in FIG. 6C.

The configuration that one pixel of 600 ppi is made of dots of 2×2 blocks, may be utilized for extension of a color representation. Namely, a range of object colors to be determined for a resolution prominent object can be broadened. In this case, the bit depth of the edge color pattern 4043 is made deeper.

(Second Embodiment)

Figure 5:
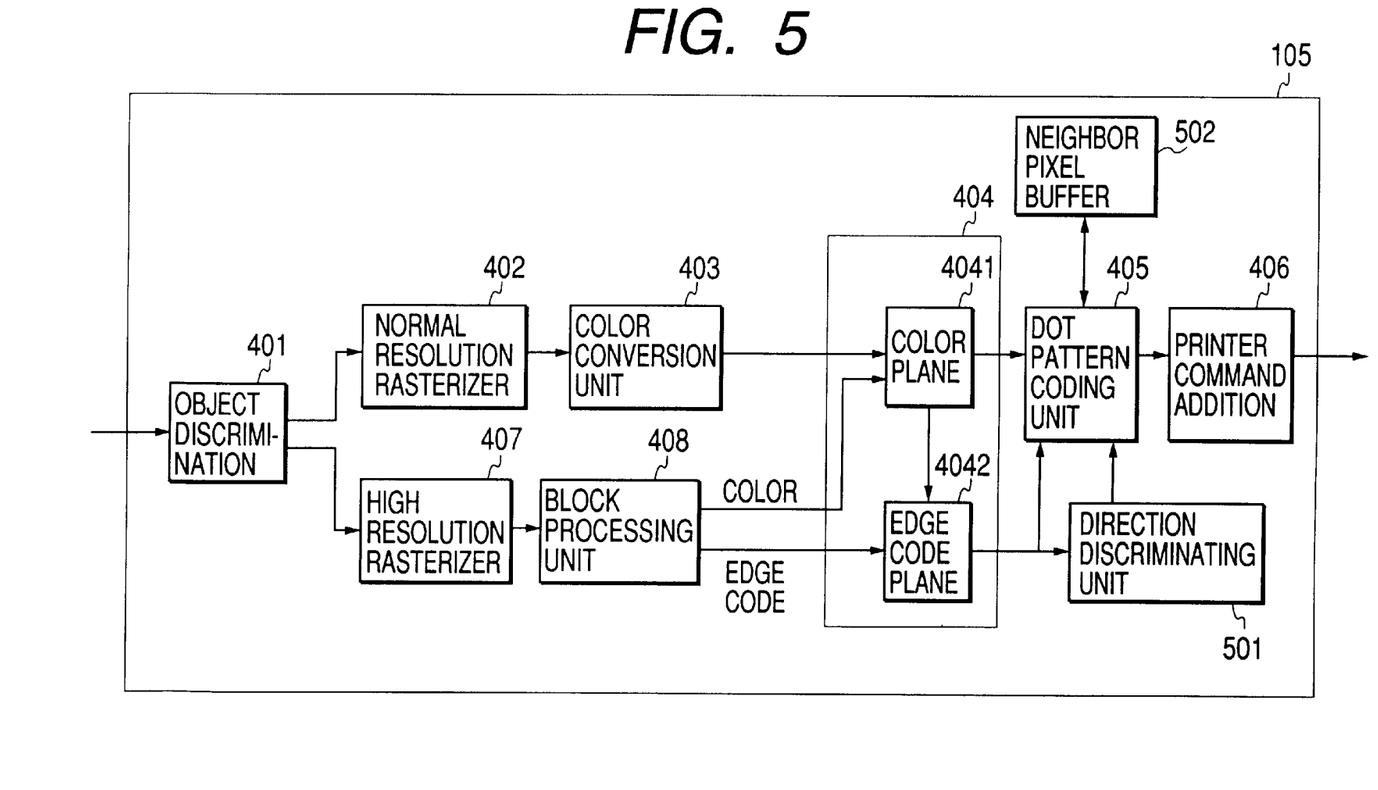
FIG. 5 is a block diagram showing the structure of a printer driver according to a second embodiment.

An example of the structure of a printer driver according to the second embodiment is shown in FIG. 5. In FIG. 5, like elements to those of the first embodiment shown in FIG. 4 are represented by using identical reference numerals.

In this example of the structure, the block processing unit 408 separates the rasterized resolution prominent object into the smooth part and the edge part, similar to the first embodiment. In this case, if the block processed pixels at 300 ppi have the edge information (edge blocks) shown in FIGS. 3A to 3C, the print color information is changed on the color plane 4041 at 300 ppi to the drawing image of an application by the raster operation. Similar to the first embodiment, the edge information is edge-coded and stored in the edge code plane 4042.

A problem associated with dot pattern creation is that there is no information as to what dot is formed in the edge pattern not hatched, because the color plane 4041 of 300 ppi has the color information of only the edge block. In this embodiment, therefore, a direction discriminating unit 501 and a neighbor pixel buffer 502 are provided in order to perform a process of obtaining dot information from neighbor blocks.

The direction discriminating unit 501 discriminates between the directions of edge blocks. Each edge block has up/down and right/left directions. This information is contained in the edge code, and is passed as 2-bit direction information to the dot pattern coding unit 405.

Figure 7:
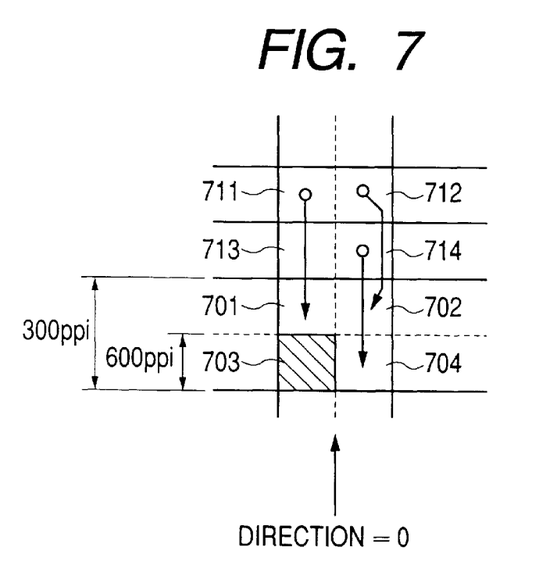
FIG. 7 is a diagram illustrating the formation of a dot pattern.

The neighbor pixel buffer 502 stores therein a raster line to be processed and the dot patterns on neighbor raster lines. When each edge block is processed, the dot pattern coding unit 405 acquires dot information from the neighbor block in the direction represented by the direction information supplied from the direction discriminating unit 501. This is illustrated in FIG. 7. Blocks 701, 703 and 704 are edge blocks, assuming that the dot pattern shown in FIG. 3A. If the information supplied from the direction discriminating unit is Direction=0, it is defined that the direction is an up direction. In this case, as the dots 701, 702 and 704, dots in the neighbor blocks in the direction of Direction =OOh are used as indicated by arrows. Namely, a dot 711 is used as the dot 701, a dot 712 is used as the dot 702, and a dot 714 is used as the dot 704. Similarly, if Direction=1, a dot in the right neighbor block is used, if Direction=2, a dot in the down neighbor block is used, and if Direction=3, a dot in the left neighbor block is used. How dots in neighbor blocks are used may be performed in various ways. If an edge block is at an end point and there is no neighbor block in the discriminated direction, a dot in another direction may be used or an edge color dot may be used.

In this embodiment described above, the edge color plane is not necessary because an edge color is stored in the color plane.

According to the embodiments described above, a gradation prominent object such as image data even in the same page is rasterized at a dot resolution lower than that of the printer engine, and a gradation is expressed by blocks of a plurality of dots so that the gradation representation can be improved. Further, since a relatively low resolution of rasterization is used, the process can be performed at high speed. For a resolution prominent object, rasterization and dot pattern generation are performed at a higher resolution to realize an image of high quality and high resolution.

(Third Embodiment)

Figure 8:
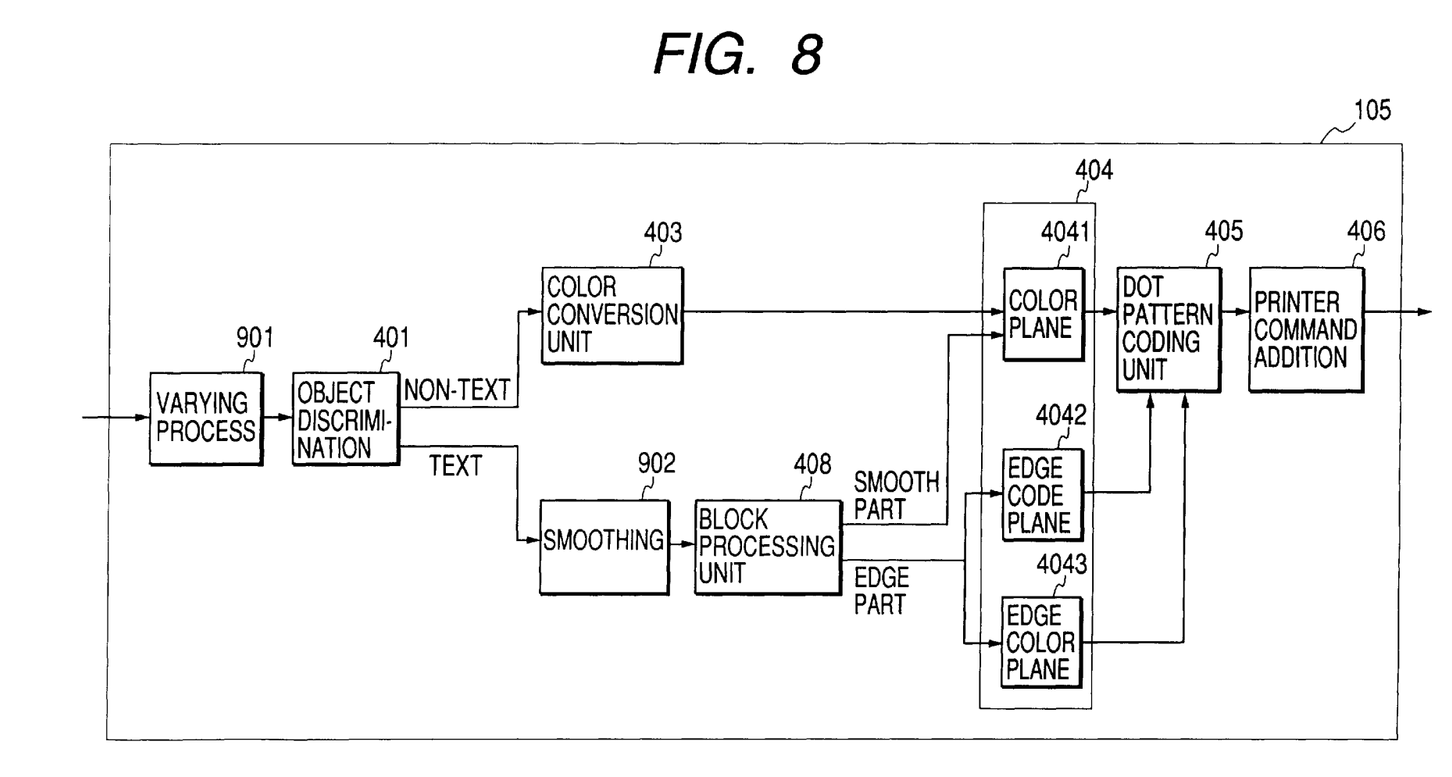
FIG. 8 is a block diagram showing the structure of a printer driver according to a third embodiment.

An example of the structure of a printer driver according to the third embodiment is shown in FIG. 8. In FIG. 8, like elements to those of the first embodiment shown in FIG. 4 are represented by using identical reference numerals.

In this embodiment, Web information written with HTML is printed. When text data is passed to the printer driver, the drawing control system 104 passes already rasterized display data. A variable magnification unit 901 converts a passed bit map including the text data into the data of 300 ppi to be printed. An object discriminating unit 401 judges whether the object is a text. If the object is not a text, the processes same as the first embodiment at the color conversion unit 403 and following units are executed. If the object is a text, a smoothing unit 902 performed a smoothing process to improve the resolution and quality. It is assumed that the resolution is set to 600 ppi which is twice that of the non-text. The processes same as the first embodiment at the block processing unit 408 and following units are executed.

In this embodiment, in accordance with the already rasterized display text information, the printer driver performs the image processing. It is therefore not necessary to rasterize the Web information written with HTML on the printer side. The same image on the display can be output, without dealing with various outline fonts on the printer side. Further, since the process of realizing the edge block property is performed, the text part can be reproduced in a good state.

The drawing control system may pass the text data in the form of text code to the printer driver 105, the printer drive 105 rasterizes it by using display fonts, and the rasterized text is subjected to the smoothing and block processes. Also in this case, the printer driver is not required to prepare printer outline fonts.

(Another Embodiment)

The present invention may be applied to a system constituted by a plurality of apparatuses (e.g., a host computer, interface units, a reader, a printer, and the like) or to a system constituted by a single apparatus (e.g., a copier or a fax).

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disk, a hard disk, an optical disk, a photomagnetic disk, a CD-ROM, a magnetic tape, a non-volatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The invention has been described in connection with the above preferred embodiments. The invention is not limited only to the above embodiments, but various modification are possible without departing from the scope of the appended claims.

What is claimed is:

1. An image processing method for developing a drawing object, converting the drawing object into a code representative of a pattern for each set of a plurality of dots, and outputting the code to an output device, the method comprising the steps of:

judging whether the drawing object is a resolution prominent object;

developing a drawing object which is not the resolution prominent object at a first resolution to convert into the code;

developing the resolution prominent object at a second resolution higher than the first resolution;

deriving an edge portion from an image developed at the second resolution, for each of blocks constituted of the plurality of dots, and converting the edge portion into an edge pattern code for each set of the plurality of dots; and outputting the code and the edge pattern code to the output device.

2. An image processing method according to claim 1, wherein blocks other than the edge portion of an image developed by the second resolution are developed by using the code.

3. An image processing method according to claim 1, wherein the output device is an ink jet printer having a printer head for forming an image at the second resolution.

4. An image processing method according to claim 1, wherein the resolution prominent object is of a type of texts or graphics, and a monochromatic object capable of being substantially printed by one print dot of a printer.

5. An image processing apparatus for developing a drawing object, converting the drawing object into a code representative of a pattern for each set of a plurality of dots, and outputting the code to an output device, the image processing apparatus comprising:

judging means for judging whether the drawing object is a resolution prominent object;

first developing means for developing a drawing object which is not the resolution prominent object at a first resolution to convert into the code;

second developing means for developing the resolution prominent object at a second resolution higher than the first resolution;

deriving means for deriving an edge portion from an image developed at the second resolution, for each of blocks constituted of the plurality of dots, and converting the edge portion into an edge pattern code for each set of the plurality of dots; and output means for outputting the code and the edge pattern code to the output device.

6. A computer readable storage medium storing programs for executing a process of developing a drawing object, converting the drawing object into a code representative of a pattern for each set of a plurality of dots, and outputting the code to an output device, the programs comprising:

a program for judging whether the drawing object is a resolution prominent object;

a program for developing a drawing object which is not the resolution prominent object at a first resolution to convert into the code;

a program for developing the resolution prominent object at a second resolution higher than the first resolution;

a program for deriving an edge portion from an image developed at the second resolution, for each of blocks constituted of the plurality of dots, and converting the edge portion into an edge pattern code for each set of the plurality of dots; and a program for outputting the code and the edge pattern code to the output device.

* * * * *